United States Patent
Yoshinaga et al.

(10) Patent No.: US 11,879,178 B2
(45) Date of Patent: Jan. 23, 2024

(54) ELECTROCHEMICAL DEVICE

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Norihiro Yoshinaga, Yokohama Kanagawa (JP); Ryota Kitagawa, Setagaya Tokyo (JP); Shinichi Sekiguchi, Bunkyo Tokyo (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 159 days.

(21) Appl. No.: 17/406,572

(22) Filed: Aug. 19, 2021

(65) Prior Publication Data
US 2022/0298658 A1    Sep. 22, 2022

(30) Foreign Application Priority Data
Mar. 18, 2021  (JP) .................................. 2021-044794

(51) Int. Cl.
  C25B 13/00  (2006.01)
  C25B 11/093  (2021.01)
  C25B 9/19  (2021.01)
  C25B 1/04  (2021.01)

(52) U.S. Cl.
  CPC ................ *C25B 13/00* (2013.01); *C25B 1/04* (2013.01); *C25B 9/19* (2021.01); *C25B 11/093* (2021.01)

(58) Field of Classification Search
None
See application file for complete search history.

(56) References Cited

U.S. PATENT DOCUMENTS

2010/0084259 A1*  4/2010  Kato .................... C25B 1/13
                                                        204/252
2021/0395116 A1* 12/2021  Yu ........................... C25B 15/08

FOREIGN PATENT DOCUMENTS

| JP | H07-272739 A | 10/1995 | |
|----|---|---|---|
| JP | 2004-300510 A | * 10/2004 | ............. C25B 15/00 |
| JP | 4751594 B2 | 8/2011 | |
| JP | 2012-067343 A | 4/2012 | |

(Continued)

OTHER PUBLICATIONS

Machine translation of Yamakawa et al (JP 2012-067343) (Year: 2012).*

(Continued)

*Primary Examiner* — Harry D Wilkins, III
(74) *Attorney, Agent, or Firm* — Foley & Lardner LLP

(57) ABSTRACT

An electrochemical device of an embodiment includes: an electrochemical cell including a first electrode having a first flow path, a second electrode having a second flow path, and a separating membrane sandwiched between the first electrode and the second electrode; a gas-liquid separation tank which is connected to the first flow path of the first electrode and to which a product produced at the first electrode and water permeating from the second electrode to the first electrode are sent at an operation time; and a water sealing pipe which is connected to a liquid portion of the gas-liquid separation tank, and to send water in the gas-liquid separation tank to the first flow path of the first electrode at a stop time.

7 Claims, 3 Drawing Sheets

(56) References Cited

FOREIGN PATENT DOCUMENTS

| | | |
|---|---|---|
| JP | 2013-199697 A | 10/2013 |
| JP | 2019-099905 A | 6/2019 |
| JP | 2020-084259 A | 6/2020 |
| JP | 2020-169381 A | 10/2020 |

OTHER PUBLICATIONS

Machine translation of Nonomura et al JP 2004-300510 A (Year: 2004).*

* cited by examiner

ELECTROCHEMICAL DEVICE

CROSS REFERENCE TO RELATED APPLICATION

This application is based upon and claims the benefit of priority from Japanese Patent Application No. 2021-044794, filed on Mar. 18, 2021; the entire contents of which are incorporated herein by reference.

FIELD

Embodiments disclosed herein relate to an electrochemical device.

BACKGROUND

As a representative example of an electrochemical device such as an electrolytic device, there is known a water electrolysis device which electrolyzes water ($H_2O$) to produce hydrogen ($H_2$) and oxygen ($O_2$). The water electrolysis device includes an electrolysis cell having an anode, a cathode, and a polymer electrolyte membrane sandwiched between them, for example. In the water electrolysis device, by electrolyzing water ($H_2O$), hydrogen ($H_2$) is produced at the cathode, and oxygen ($O_2$) is produced at the anode. A water electrolysis cell using, as a separating membrane, such a polymer electrolyte membrane (PEM) (PEM-type water electrolysis cell) has characteristics such as a low operating temperature and high hydrogen purity. However, the PEM-type water electrolysis cell has a problem in which performing start-stop operation makes its performance likely to decrease. This is not limited to the PEM-type water electrolysis cell, but is regarded as a problem across all of electrolysis cells and electrolytic devices (electrochemical devices) using the PEM or the like as the separating membrane.

DETAILED DESCRIPTION

An electrochemical device of an embodiment includes: an electrochemical cell including a first electrode having a first flow path, a second electrode having a second flow path, and a separating membrane sandwiched between the first electrode and the second electrode; a gas-liquid separation tank which is connected to the first flow path of the first electrode and to which a product produced at the first electrode and water permeating from the second electrode to the first electrode are sent at an operation time; and a water sealing pipe which is connected to a liquid portion of the gas-liquid separation tank, and to send water in the gas-liquid separation tank to the first flow path of the first electrode at a stop time.

Hereinafter, electrochemical devices of embodiments will be described with reference to the drawings. In each embodiment presented hereinafter, substantially the same components are denoted by the same reference signs, and descriptions thereof are sometimes partly omitted. The drawings are schematic, and a relation between a thickness and a planar dimension, a ratio of thicknesses of the respective components, and the like are sometimes different from actual ones.

First Embodiment

Figure 1:
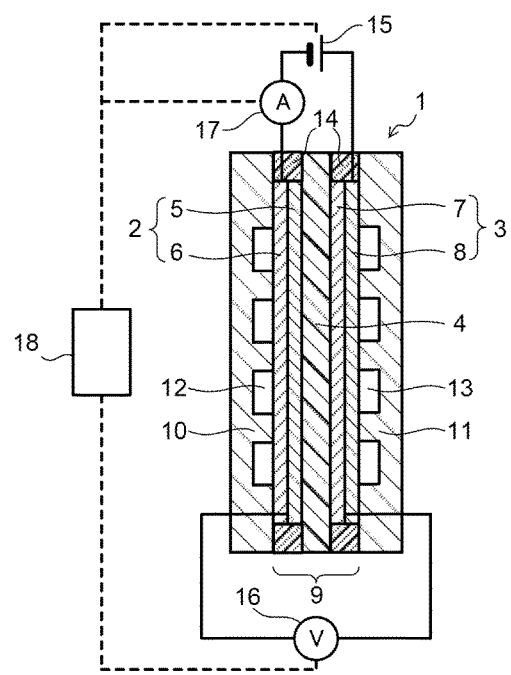
FIG. 1 is a view illustrating a configuration of an electrolysis cell in an electrochemical device of an embodiment and a connecting structure of the electrolysis cell and a power supply.

A configuration of an electrochemical cell of an electrochemical device of an embodiment and a connecting structure of the electrochemical cell and a power supply will be described with reference to FIG. 1. An electrochemical cell 1 illustrated in FIG. 1 includes a first electrode 2, a second electrode 3, and a separating membrane 4 sandwiched between the first electrode 2 and the second electrode 3. The separating membrane 4 includes a polymer electrolyte membrane (PEM), for example. When the electrochemical cell 1 is used as a water electrolysis cell, the first electrode 2 is a cathode (reduction electrode/hydrogen electrode), and the second electrode 3 is an anode (oxidation electrode/oxygen electrode). Hereinafter, a case where the electrochemical cell 1 is used as the water electrolysis cell is mainly described. A proton conducting membrane is used for the polymer electrolyte membrane as the separating membrane 4.

As a constituent material of the proton-conductive PEM, for example, a fluorocarbon resin having a sulfonic acid group is used. As concrete examples of such a material, there can be cited NAFION (registered trade mark) manufactured by Dupont de Nemours, Inc. which is a fluorocarbon resin in which tetrafluoroethylene is sulfonated to be polymerized, FLEMION (registered trade mark) manufactured by ASAHIKASEI CORPORATION, ACIPLEX (registered trade mark) manufactured by AGC Inc., and the like. The separating membrane 4 is not limited to the polymer electrolyte membrane, but may be an electrolyte membrane such as a hydrocarbon membrane containing an electrolyte component or a membrane containing an inorganic substance such as a tungstic acid or a phosphotungstic acid.

The second electrode 3 being the anode decomposes water ($H_2O$) by oxidation reaction to produce a hydrogen ion ($H^+$) and oxygen ($O_2$). The first electrode 2 being the cathode reduces the hydrogen ion ($H^+$) produced at the anode to produce hydrogen ($H_2$). The first electrode 2 being the cathode has a first catalyst layer 5 and a first power supply layer 6. The first catalyst layer 5 is disposed to be brought into contact with the separating membrane 4. The second electrode 3 being the anode has a second catalyst layer 7 and a second power supply layer 8. The second catalyst layer 7 is disposed to be brought into contact with the separating membrane 4. A membrane electrode assembly (MEA) 9 is constituted by sandwiching the separating membrane 4 such as the PEM between the above first electrode 2 and second electrode 3.

For the first catalyst layer 5 of the first electrode 2 being the cathode, there is used, for example, a metal such as platinum (Pt), silver (Ag), or palladium (Pd), an alloy containing at least one of Pt, Ag, Pd (Pt alloy, Ag alloy, or Pd alloy), or the like. It is more preferable to use Pt or the Pt alloy such as PtCo, PtFe, PtNi, PtPd, PtIr, PtRu, or PtSn for the first catalyst layer 5. For the second catalyst layer 7 of the second electrode 3 being the anode, there is used, for example, an iridium (Ir) oxide, a ruthenium (Ru) oxide, a palladium (Pd) oxide, an Ir composite oxide, a Ru composite oxide, a Pd composite oxide, or the like. As a composite metal constituting the Ir composite oxide or the Ru composite oxide, there can be cited titanium (Ti), niobium (Nb), vanadium (V), chromium (Cr), manganese (Mn), cobalt (Co), zing (Zn), zirconium (Zr), molybdenum (Mo), tantalum (Ta), Ru, Ti, Pd, or the like. It is more preferable to use the Ir oxide, the Ir composite oxide, or the like for the second catalyst layer 7.

For the first power supply layer 6 of the first electrode 2 and the second power supply layer 8 of the second electrode 3, a material having gas diffusibility and conductivity is used. Concretely, a porous conductive member or the like is applied to the first power supply layer 6 and the second power supply layer 8. For the first power supply layer 6 and the second power supply layer 8, there is used a porous metal member, metal felt, metallic nonwoven fabric obtained by entangling metal fibers, of Ti, Ta, SUS, Ni, Pt, or the like, carbon paper, carbon cloth, or the like. Ti excellent in corrosion resistance is preferably used for the first power supply layer 6 and the second power supply layer 8, and this enables improvement in durability.

The above-described MEA 9 is sandwiched between a cathode separator 10 and an anode separator 11, and the electrochemical cell 1 is constituted by them. A first flow path 12 which makes a reactant and a product flow therethrough is provided in the cathode separator 10. The first electrode 2 has the first flow path 12 facing the first power supply layer 6. A second flow path 13 which makes a reactant and a product flow therethrough is provided in the anode separator 11. The second electrode 3 has the second flow path 13 facing the second power supply layer 8. Seal members 14 are disposed on side surfaces of the first catalyst layer 5 and the first power supply layer 6 and side surfaces of the second catalyst layer 7 and the second power supply layer 8, and prevent leakage of gas or liquid from the MEA 9 and the electrochemical cell 1.

The electrochemical cell 1 is not limited to a single-cell structure, but may have a stack-cell structure in which a plurality of electrochemical cells 1 are stacked. A shape of a stack cell is not particularly limited, but is appropriately selected depending on a desired voltage, a reaction amount, and the like. When the plurality of electrochemical cells 1 are used, it is also possible to employ a structure in which the plurality of electrochemical cells 1 are disposed in a planar manner, or the like, without being limited to the stack-cell structure. Moreover, it is also possible to stack the cells disposed in a planar manner. The number of single cells included in the electrochemical cell 1 is not particularly limited either, but is appropriately selected.

As the reactant to be supplied to the electrochemical cell 1, there can be used, for example, water or an aqueous solution containing at least one kind of hydrogen, reformed gas, methanol, ethanol, formic acid, and so on. The electrochemical cell 1 in the embodiment is not limited to the electrolysis cell for the water electrolysis, but can be applied to various electrochemical cells as long as it is an electrolysis cell using oxide as a catalyst the same such as a cell for electrolytic reaction of carbon dioxide.

The first electrode 2 and the second electrode 3 of the electrochemical cell 1 are electrically connected to a voltage applying unit (power supply) 15. Moreover, a voltage measuring unit 16 and a current measuring unit 17 are provided on a circuit which electrically connects the first electrode 2 and the second electrode 3 to the power supply 15. The operation of the power supply 15 is controlled by a control unit 18. That is, the control unit 18 controls the power supply 15 to apply voltage to the electrochemical cell 1. The voltage measuring unit 16 is electrically connected to the first electrode 2 and the second electrode 3, and measures a voltage to be applied to the electrochemical cell 1. Its measurement information is transmitted to the control unit 18. The current measuring unit 17 is inserted into a voltage application circuit with respect to the electrochemical cell 1, and measures a current flowing through the electrochemical cell 1. Its measurement information is transmitted to the control unit 18.

The control unit 18 is constituted by a computer such as, for example, a PC or a microcomputer, and subjects a data signal output from each of the units to arithmetic processing to output a necessary control signal to each component. The control unit 18 further has a memory, and according to a program stored in the memory, controls an output of the power supply 15 according to each measurement information to perform such control as application of voltage to the electrochemical cell 1 and a change in load. Note that when the electrochemical cell 1 is used for a cell reaction, voltage is loaded on the electrochemical cell 1. When the electrochemical cell 1 is used for a reaction other than the cell reaction, for example, a hydrogen production reaction by water electrolysis, an electrolytic reaction of carbon dioxide, or the like, voltage is applied to the electrochemical cell 1. The electrochemical device of the embodiment is configured to load voltage between the first electrode 2 and the second electrode 3 and make an electrochemical reaction progress.

Next, the electrochemical device of the first embodiment including the electrochemical cell 1 illustrated in FIG. 1 will be described with reference to FIG. 2. A configuration in a case of applying the electrochemical device to a water electrolysis device is mainly described here, but the electrochemical device of the embodiment is not limited to this, and may be a carbon dioxide electrolytic device, or the like. An electrochemical device 20 illustrated in FIG. 2 includes a water supply system 21 which supplies water to the second electrode 3 of the electrochemical cell 1, and further includes a hydrogen discharge system 22 which discharges hydrogen and water from the first electrode 2 of the electrochemical cell 1.

The water supply system 21 has a first water tank 24 connected to a pure-water production device 23. To the first water tank 24, water is supplied from the pure-water production device 23. The water accommodated in the first water tank 24 is sent via a pump 25 and a first pipe 26 to the second electrode 3 of the electrochemical cell 1. Water decomposition is performed at the second electrode 3 as the anode, and oxygen ($O_2$) produced by the water decomposition and excessive water are sent back to the first water tank 24. The water supply system 21 is connected to an inlet and an outlet of the second flow path 13 of the second electrode 3. The first water tank 24 has a gas-liquid separation function, and the oxygen ($O_2$) separated in the first water tank 24 is recovered. The water separated in the first water tank 24 is circulated via the pump 25, the first pipe 26, and the second flow path 13.

The hydrogen discharge system 22 is connected via a second pipe 28 to a second water tank 27. Water is not supplied to the first electrode 2 as the cathode, but water is sent through the separating membrane 4 to the first electrode 2 side, thus also discharging the water while being mixed with hydrogen. For this reason, the second pipe (operating pipe) 28 is connected to a gas portion of the second water tank 27 having a gas-liquid separation mechanism. The hydrogen ($H_2$) separated in the second water tank 27 is recovered. Moreover, a third pipe 29 is connected to the second water tank 27. The third pipe 29 is, as described in detail later, a pipe (water sealing pipe) which sends water from the second water tank 27 to the electrochemical cell 1, and is connected to a liquid portion of the second water tank 27 and an inlet of the first flow path 12 of the first electrode 2 as the cathode. In the second pipe 28 and the third pipe 29, check valves 30, 31 are provided respectively. In a hydrogen discharge pipe 32 of the second water tank 27, an electromagnetic valve 33 is provided. Water accommodated in the second water tank 27 may be sent to the first water tank 24 as necessary. At this time, because there is a risk of explosion in the mixing of hydrogen and oxygen, a valve is preferably provided in a pipe connecting the first water tank 24 and the second water tank 27.

Next, the operation of the electrochemical device 20 illustrated in FIG. 2 will be described. When the electrolysis of water is performed, applying voltage to the second electrode 3 as the anode from an external power supply (18) causes water ($H_2O$) to be electrolyzed, resulting in that a reaction of a formula (1) indicated below occurs.

$$2H_2O \rightarrow O_2 + 4H^+ + 4e^- \tag{1}$$

Protons ($H^+$) produced at this time are sent through the separating membrane 4 to the first electrode 2 as the cathode. Further, electrons ($e^-$) reach the first electrode 2 through an external circuit. Hydrogen is produced at the first electrode 2 as the cathode by a reaction of a formula (2) indicated below.

$$4H^+ + 4e^- \rightarrow 2H_2 \tag{2}$$

The reactions of the above-described formula (1) and formula (2) allow hydrogen and oxygen to be manufactured.

Here, in a case where the third pipe 29 is not connected to the second water tank 27, when the operation of the electrochemical device 20 is stopped, the supply of water to the second electrode 3 as the anode is stopped, and therefore the hydrogen produced at the first electrode 2 as the cathode is likely to flow into the second electrode 3 side. Mixing the hydrogen in the second electrode 3 results in not only reducing the metal oxide catalyst such as the Ir oxide or the Ru oxide contained in the second catalyst layer 7 to decrease catalyst properties, but also putting the metal oxide catalyst in an electrically unstable state to thereby cause elution of metal such as Ir and make performance of the electrochemical reaction in the second electrode 3 deteriorate. This triggers a reduction in performance of the electrochemical cell 1.

Thus, in the electrochemical device 20 of the first embodiment, the second water tank 27 and an inlet of the first flow path 12 of the first electrode 2 are connected by the third pipe 29 having the check valve 31. When the operation of the electrochemical device 20 is stopped, water is sent from the second water tank 27 to the first electrode 2, thereby submerging the first flow path 12. Because hydrogen remaining in the first flow path 12 is pushed out by the water, it is possible to suppress the reduction of the metal oxide catalyst of the second electrode 3 caused by the remaining hydrogen. In order to achieve such a configuration as described above, the second water tank 27 is disposed in a position higher than the electrochemical cell 1. At an operation time, the produced hydrogen gas is discharged through the second pipe 28 and the second water tank 27 to the outside. At this time, water is not sent from the second water tank 27 to the first electrode 2 in relation to pressure by the check valve 31 of the third pipe 29. On the other hand, at the operation stop time, the water is sent automatically from a position lower than a liquid level of the second water tank 27 through the third pipe 29 to the first flow path 12 of the first electrode 2 by a head pressure difference, which submerges the first flow path 12.

At this time, in order to reduce a pressure loss to smoothly submerge the first flow path 12 of the first electrode 2, a pipe diameter of the third pipe 29 which sends water at the stop time is preferably as large as possible. Concretely, the pipe diameter of the third pipe 29 is preferably ⅜ inch or more, and further, more preferably ½ inches or more. Further, the check valve 31 is provided at least in the third pipe. This results in discharging a hydrogen gas from the first pipe 28 at the operation time, which makes it possible to prevent water from the third pipe 29 from flowing back, thus exerting effects of making temperature uniform and making voltage stable.

According to the electrochemical device 20 of the first embodiment, it is possible to expel a hydrogen gas remaining in the first electrode 2 as the cathode immediately after the stop of the device. As a result, since it is possible to suppress the reduction of the metal oxide catalyst of the second electrode 3 as the anode, it becomes possible to suppress the reduction in the performance of the electrochemical cell 1. That is, it is possible to provide the electrochemical device 20 including the electrochemical cell 1 which stably exhibits the performance.

Second Embodiment

An electrochemical device 20 of a second embodiment will be described with reference to FIG. 3. In the electrochemical device 20 illustrated in FIG. 3, a third pipe 29 which sends water from a second water tank 27 to an electrochemical cell 1 at a device stop time is connected in the middle of a second pipe 28 connecting an inlet of a first flow path 12 of a first electrode 2 and the second water tank 27. A check valve 31 is provided in the third pipe 29. The third pipe 29 is connected via the second pipe 28 to an opening being an outlet of hydrogen in the first flow path 12 at an operation time. Moreover, an electromagnetic valve 34 is connected to an opening being an outlet of water in the first flow path 12 at the device stop time. Regarding a configuration other than the above, the electrochemical device 20 of the second embodiment has a configuration similar to that of the first embodiment.

In the electrochemical device 20 of the second embodiment, hydrogen and water are sent from one opening (the outlet at the operation time) of the first flow path 12 via the second pipe 28 to the second water tank 27 at the device operation time. The electromagnetic valve 34 is closed at the device operation time. At the device stop time, water in the second water tank 27 is sent via the third pipe 29 and the check valve 31 to one opening (the outlet at the operation time/an inlet at the stop time) of the first flow path 12. At this time, the electromagnetic valve 34 of the first flow path 12 is opened only for, for example, 20 seconds until water goes out from the other opening (an inlet at the stop time) of the first flow path 12, thereafter closing the electromagnetic valve 34. This allows the first flow path 12 to be submerged at the device stop time, and allows remaining hydrogen to be pushed out by the water. Consequently, similarly to the first embodiment, it becomes possible to suppress a reduction of a metal oxide catalyst of a second electrode 3 caused by hydrogen.

EXAMPLES

Next, examples and evaluation results thereof will be described.

Example 1

Figure 2:
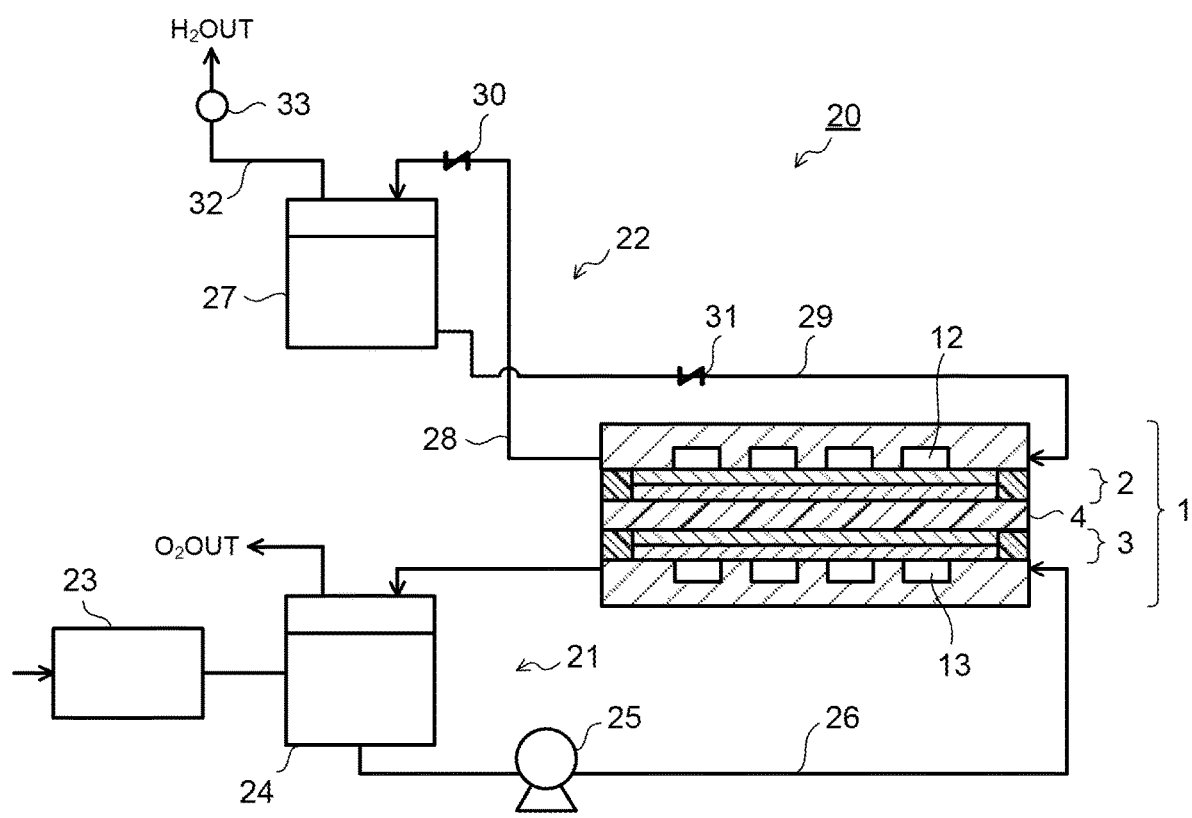
FIG. 2 is a view illustrating an electrochemical device of a first embodiment.

As illustrated in FIG. 2, an electrochemical device 20 was constituted in which a second water tank 27 and a first flow path 12 of a first electrode 2 in an electrochemical cell (electrolysis cell) 1 were connected by a third pipe 29. At a device operation time, hydrogen produced at the first electrode 2 and water are sent via a second pipe to the second water tank 27. Since a check valve 31 is provided in the third pipe 29, the water does not flow back. On the other hand, at a device stop time, the water in the second water tank 27 is sent to the first flow path 12.

In the above-described electrochemical device 20, hydrogen is produced on the first electrode (hydrogen electrode) 2 side of the electrochemical cell 1 at the device operation time. From a hydrogen-side outlet of the first electrode 2, the produced hydrogen is discharged through a pipe of ⅜-inch diameter to the water tank 27 together with water having crossed over from a second electrode (oxygen electrode) 3. The hydrogen gas is discharged through an electromagnetic valve 33 to the outside. The water is condensed in the water tank 27. At this time, when a liquid level becomes equal to or higher than a prescribed height in the water tank 27, the electrochemical device 20 is configured to open an electromagnetic valve and move the water to a water tank 24. At a hydrogen-electrode inlet of the electrolysis cell 1, the pipe 29 of ½-inch diameter which is connected from a liquid portion lower than the liquid level of the water tank 27 is connected, and the check valve 31 is provided in the pipe 29. At the device operation time, an effect of the check valve 31 prevents water from flowing back.

In the electrochemical device 20 having such a configuration as described above, it was confirmed that water automatically flowed into the hydrogen electrode of the electrolysis cell 1 at the device stop time to submerge the first flow path 12. By using such a device, a process in which the operation was performed at 50 A for one hour and thereafter stopped for one hour was set to one time, and the process was repeated 2000 times. At an early stage, a voltage was 1.85 V, and a current density was 2 A/cm². In regard to this, it was confirmed that also after being repeated 2000 times, the values were maintained at a voltage of 1.87 V and a current density of 2 A/cm².

Example 2

Figure 3:
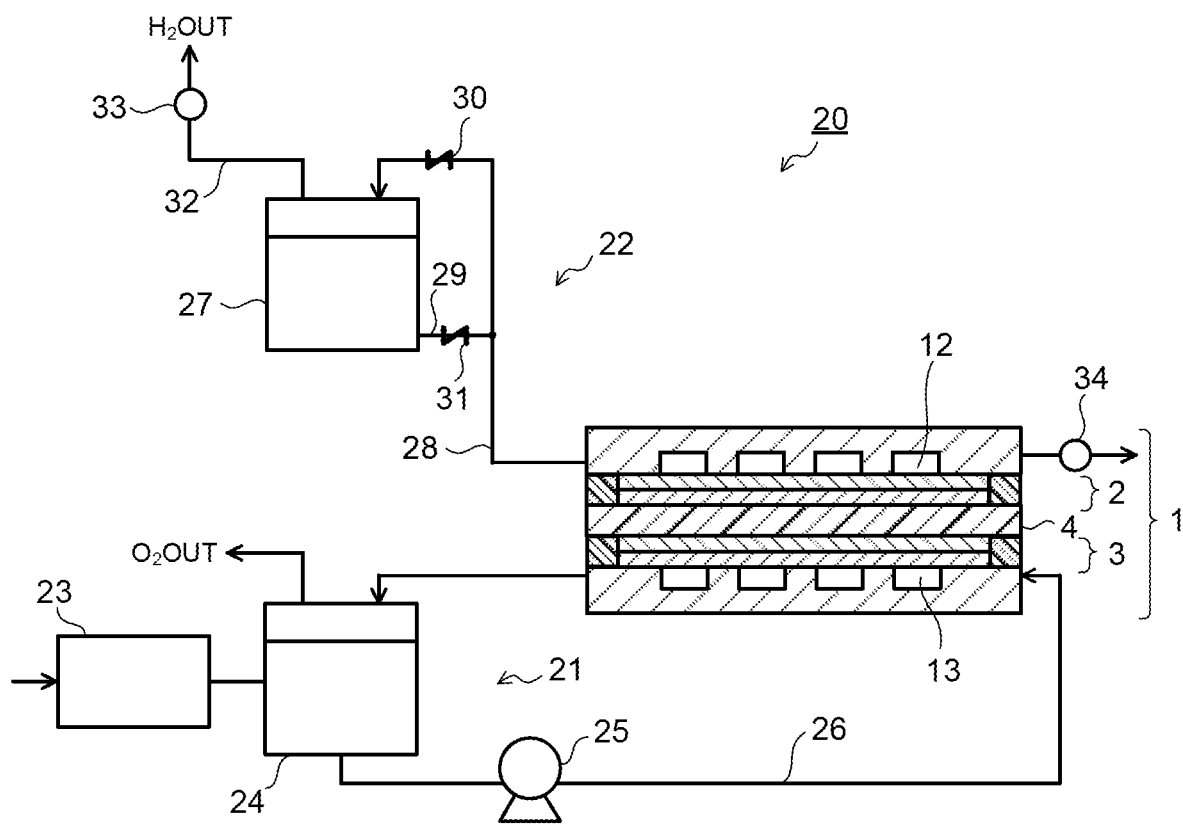
FIG. 3 is a view illustrating an electrochemical device of a second embodiment.

As illustrated in FIG. 3, an electrochemical device 20 was constituted in which a pipe 29 provided below a liquid level of a second water tank 27 was connected to a pipe 28 connecting the second water tank 27 and a first flow path 12 of a first electrode 2 in an electrochemical cell (electrolysis cell) 1. At a device operation time, hydrogen produced at the first electrode 2 and water are sent via the second pipe to the second water tank 27. Since a check valve 31 is provided in the third pipe 29, the water does not flow back. On the other hand, at a device stop time, the water in the second water tank 27 is sent to the first flow path 12.

In the above-described electrochemical device 20, a water pipe connected to the outside was connected also to a hydrogen-electrode outlet of the electrolysis cell 1, and an electromagnetic valve 34 was installed therein. The electromagnetic valve 34 was closed at an operation time of the electrolysis cell, and at a stop time, the operation in which the electromagnetic valve 34 was opened only for 20 seconds until water went out from the water pipe and thereafter closed was performed for each stop. By using this device, a process in which the operation was performed at 50 A for one hour and thereafter stopped for one hour was set to one time, and the process was repeated 2000 times. At an early stage, a voltage was 1.85 V, and a current density was 2 A/cm². In regard to this, it was confirmed that also after being repeated 2000 times, the values were maintained at a voltage of 1.865 V and a current density of 2 A/cm².

Example 3

As illustrated in FIG. 3, an electrochemical device 20 was constituted in which a pipe 29 provided below a liquid level of a second water tank 27 was connected to a pipe 28 connecting the second water tank 27 and a first flow path 12 of a first electrode 2 in an electrochemical cell (electrolysis cell) 1. Further, the second water tank 27 was installed in a position lower than the first electrode 2. By tightening an electromagnetic valve 33 at a device operation time, a pressure of a circulating system on a hydrogen side was adjusted so as to be ten atmospheres. The hydrogen at ten atmospheres which is produced at the first electrode 2 and water are sent via the second pipe 28 to the second water tank 27. Since a check valve 31 is provided in the third pipe 29, the water does not flow back.

In the above-described electrochemical device 20, a water pipe connected to the outside was connected also to a hydrogen-electrode outlet of the electrolysis cell 1, and an electromagnetic valve 34 was installed therein. The electromagnetic valve 34 was closed at an operation time of the electrolysis cell, and at a stop time, the operation in which the electromagnetic valve 34 was opened only for 20 seconds until water went out from the water pipe and thereafter closed was performed for each stop. At the device stop time when the electromagnetic valve 34 is opened, due to a difference between ten atmospheres in the tank and atmospheric pressure at a downstream portion of the electromagnetic valve 34, the water in the second water tank 27 is sent to the first flow path 12. By using this device, a process in which the operation was performed at 50 A for one hour and thereafter stopped for one hour was set to one time, and the process was repeated 2000 times. At an early stage, a voltage was 1.85 V, and a current density was 2 A/cm². In regard to this, it was confirmed that also after being repeated 2000 times, the values were maintained at a voltage of 1.865 V and a current density of 2 A/cm².

Comparative Example 1

Without installing the pipe 29 in FIG. 2 and FIG. 3, an electrochemical device 20 was constituted. Note that a water tank 24 and a water tank 27 were connected by a pipe having an electromagnetic valve. This pipe is the one in which when a liquid level becomes equal to or higher than a prescribed height in the water tank 27, the electromagnetic valve is opened to move water to the water tank 24. In the electrochemical device 20 having such a configuration, a hydrogen electrode is not submerged at a device stop time. By using such a device, 2000-time operations were repeated under the same conditions as those in Examples 1, 2. At an early stage, a voltage was 1.85 V, and a current density was 2 A/cm². In contrast to this, after the 2000-time operations, the voltage rose to 2.25 V and the current density was 2 A/cm². It was confirmed from the above results that a leak of hydrogen at the stop time made a deterioration of an electrolysis cell 1 progress.

Note that the configurations of the above-described embodiments are applicable in combination with each other, and parts thereof are replaceable. While certain embodiments of the present invention have been described above, these embodiments have been presented by way of example only, and are not intended to limit the scope of the invention. Indeed the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrochemical device comprising:
   an electrochemical cell including a first electrode having a first flow path, a second electrode having a second flow path, and a separating membrane sandwiched between the first electrode and the second electrode;
   a gas-liquid separation tank which is connected to the first flow path of the first electrode and to which a product produced at the first electrode and water permeating from the second electrode to the first electrode are sent at an operation time;
   an operating pipe connected to the first flow path of the first electrode and a gas portion of the gas-liquid separation tank; and
   a water sealing pipe which is connected to a liquid portion of the gas-liquid separation tank and the operating pipe, and to send water in the gas-liquid separation tank to the first flow path of the first electrode at a stop time, wherein
   the water sealing pipe is connected via the operating pipe to an opening being an outlet of hydrogen in the first flow path at an operation time, and has a check valve, and
   an electromagnetic valve is connected to the opening being an outlet of water in the first flow path at a stop time.

2. The electrochemical device according to claim 1, wherein the water sealing pipe is configured to send the water from the liquid portion of the gas-liquid separation tank to the first flow path of the first electrode with a head pressure or a gas pressure being motive power.

3. The electrochemical device according to claim 1, wherein the separating membrane comprises a polymer electrolyte membrane.

4. The electrochemical device according to claim 1, wherein
   the first electrode includes a first catalyst layer disposed to be brought into contact with the separating membrane, a first power supply layer stacked on the first catalyst layer and including a porous conductive member, and the first flow path facing the first power supply layer, and
   the second electrode includes a second catalyst layer disposed to be brought into contact with the separating membrane, a second power supply layer stacked on the second catalyst layer and including a porous conductive member, and the second flow path facing the second power supply layer.

5. The electrochemical device according to claim 4, wherein
   the first catalyst layer contains at least one metal selected from the group consisting of platinum, silver, and palladium, or an alloy containing the metal, and
   the second catalyst layer contains at least one selected from the group consisting of an iridium oxide, a ruthenium oxide, a palladium oxide, an iridium composite oxide, a ruthenium composite oxide, and a palladium composite oxide.

6. The electrochemical device according to claim 1, further comprising a water tank having a gas-liquid separation mechanism, and connected to the second flow path of the second electrode, and which is configured to supply water to the second flow path, and to be sent back a product produced at the second electrode and the water.

7. The electrochemical device according to claim 1 being a water electrolysis device.

* * * * *